(12) United States Patent
Wu

(10) Patent No.: US 7,883,100 B1
(45) Date of Patent: Feb. 8, 2011

(54) SUSPENSION LIFT SYSTEM FOR GOLF CARTS WITH IMPROVED PIVOTAL NODES

(75) Inventor: BaoGui Wu, JiangSu (CN)

(73) Assignee: Suzhou Eagle Electric Vehicle Manufacturing Co., Ltd., Suzhou, Jiangsu Province (CN)

(*) Notice: Subject to any disclaimer, the term of this patent is extended or adjusted under 35 U.S.C. 154(b) by 0 days.

(21) Appl. No.: 12/852,472

(22) Filed: Aug. 7, 2010

(30) Foreign Application Priority Data

Mar. 11, 2010 (CN) .......................... 2010 1 0131598

(51) Int. Cl.
*B60G 7/00* (2006.01)
(52) U.S. Cl. ............................................. 280/124.136
(58) Field of Classification Search .......... 280/124.134, 280/124.135, 124.136, 124.138, 124.145
See application file for complete search history.

(56) References Cited

U.S. PATENT DOCUMENTS

| | | | | |
|---|---|---|---|---|
| 2,776,147 A | * | 1/1957 | Bamford | 280/124.109 |
| 3,883,152 A | * | 5/1975 | De Carbon | 280/124.138 |
| 5,558,360 A | * | 9/1996 | Lee | 280/124.138 |
| 7,004,484 B1 | * | 2/2006 | Chevalier | 280/86.751 |
| 7,581,740 B1 | | 9/2009 | Stimely | |
| 7,770,907 B2 | * | 8/2010 | Shimizu et al. | 280/124.134 |
| 2009/0194965 A1 | * | 8/2009 | Boston | 280/124.136 |

* cited by examiner

*Primary Examiner*—Paul N Dickson
*Assistant Examiner*—Robert A Coker
(74) *Attorney, Agent, or Firm*—Cheng-Ju Chiang

(57) ABSTRACT

A suspension lift system for golf carts includes a carriage, a welded front frame attached to the carriage, upper and lower arms symmetrically arranged at opposite sides of the front frame, a rotatable apparatus, a steering knuckle and an absorber. Each upper or lower arm includes a first mounting side pivotally connected to the front frame, and a spindle connection end opposite to the first mounting side. The rotatable apparatus includes a bracket including a pair of lugs and a receiving space formed therebetween for accommodating the spindle connection end. The spindle connection end and the lug are threaded by a pin in order to combine the spindle connection end and the upper bracket.

18 Claims, 5 Drawing Sheets

SUSPENSION LIFT SYSTEM FOR GOLF CARTS WITH IMPROVED PIVOTAL NODES

BACKGROUND OF THE INVENTION

1. Field of the Invention

The present invention relates to a suspension lift system for golf carts, and more particularly to a suspension lift system for golf carts with improved pivotal nodes for reinforcement thereof.

2. Description of Related Art

The existing golf cart, with seats from 2 to 6, includes a front frame and a carriage connected to the front frame. Mostly, the front frame is composed of a plurality of independent components which are finally assembled together via bolts and nuts. Typically, the carriage is fixed to a front steel spring prior to assembly of the front frame to the front steel spring. The range of the wheel dancing up and down is determined by the elasticity of the front steel spring. However, such range can not be very large due to the limited elasticity of the front steel spring. As a result, the golf cart can not be felt comfortable when it runs on a bumpy road. Besides, protection positions must be set during assembly of the front steel spring, in order that the front steel spring can endure the pressure of the body of the golf cart. Apparently, the assembly of the golf cart is relatively complex.

In order to solve the above problems, U.S. Pat. No. 7,581,740 B1, issued to Stimely on Sep. 1, 2009, discloses an improved suspension lift system with dual swing arms for golf carts. The suspension lift system includes a detachable main frame, an upper arm, a lower arm, an absorber and a steering apparatus etc. The suspension lift system can be provided with two kinds of redirector solutions depended on different demands, and can provide relative large range of the wheel dancing up and down. However, either the upper arm or the lower arm is connected to the main frame via a simple bolt hole, which may occur motion interference at the nodes, during movement of the suspension lift system. Besides, the space provided for mounting the steering apparatus is small because four poles have been arranged near the steering apparatus. Furthermore, the main frame is composed of a large number of components assembled by bolts and nuts, which will surely complex the assembly thereof.

Hence, it is desired to provide an improved suspension lift system solving the problems above.

BRIEF SUMMARY OF THE INVENTION

The present invention provides a suspension lift system for golf carts including a carriage, an undetachable front frame attached to the carriage, upper and lower arms for mating with the front frame, a rotatable apparatus, a steering knuckle and an absorber with one end mounted to the front frame and the other end mounted to either the upper arm or the lower arm. The front frame is unitarily welded and includes a bottom support bracket, a front support bracket, and a middle support bracket fixed to the bottom support bracket and the front support bracket. The upper arm includes a first mounting side pivotally connected to the front frame, and a second mounting side opposite to the first mounting side. The upper arm is swing in a vertical plane. The second mounting side includes a spindle connection end defining a through opening. The lower arm includes a third mounting side pivotally connected to the front frame, and a fourth mounting side opposite to the third mounting side. The lower arm is swing in the vertical plane as well. The rotatable apparatus includes an upper bracket pivotally connected to the second mounting side of the upper arm, a lower bracket pivotally connected to the fourth mounting side of the lower arm, and a pole connecting the upper and the lower brackets. The upper bracket includes a pair of lugs and a receiving space formed between the pair of lugs for accommodating the spindle connection end. Each lug defines a through hole aligned with the through opening. The steering knuckle includes a sleeve for receiving the pole and an axle adapted to receive a wheel. The sleeve is rotatable in a horizontal plane with respect to the upper and the lower brackets. The through opening of the spindle connection end and the through hole of each lug are threaded by a pin in order to combine the spindle connection end and the upper bracket.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENTS

Figure 1:
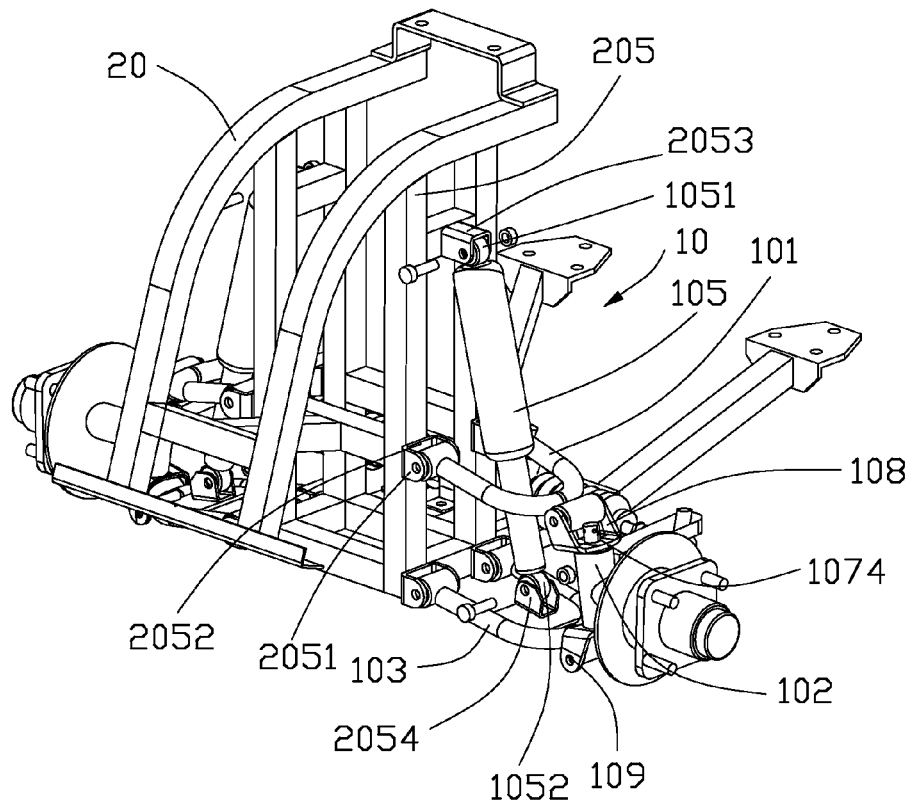
FIG. 1 is a schematic perspective view of a suspension lift system with dual swing arms according to an embodiment of the present invention.

Reference will now be made to the drawing figures to describe the embodiments of the present invention in detail. In the following description, the same drawing reference numerals are used for the same elements in different drawings.

Figure 2:
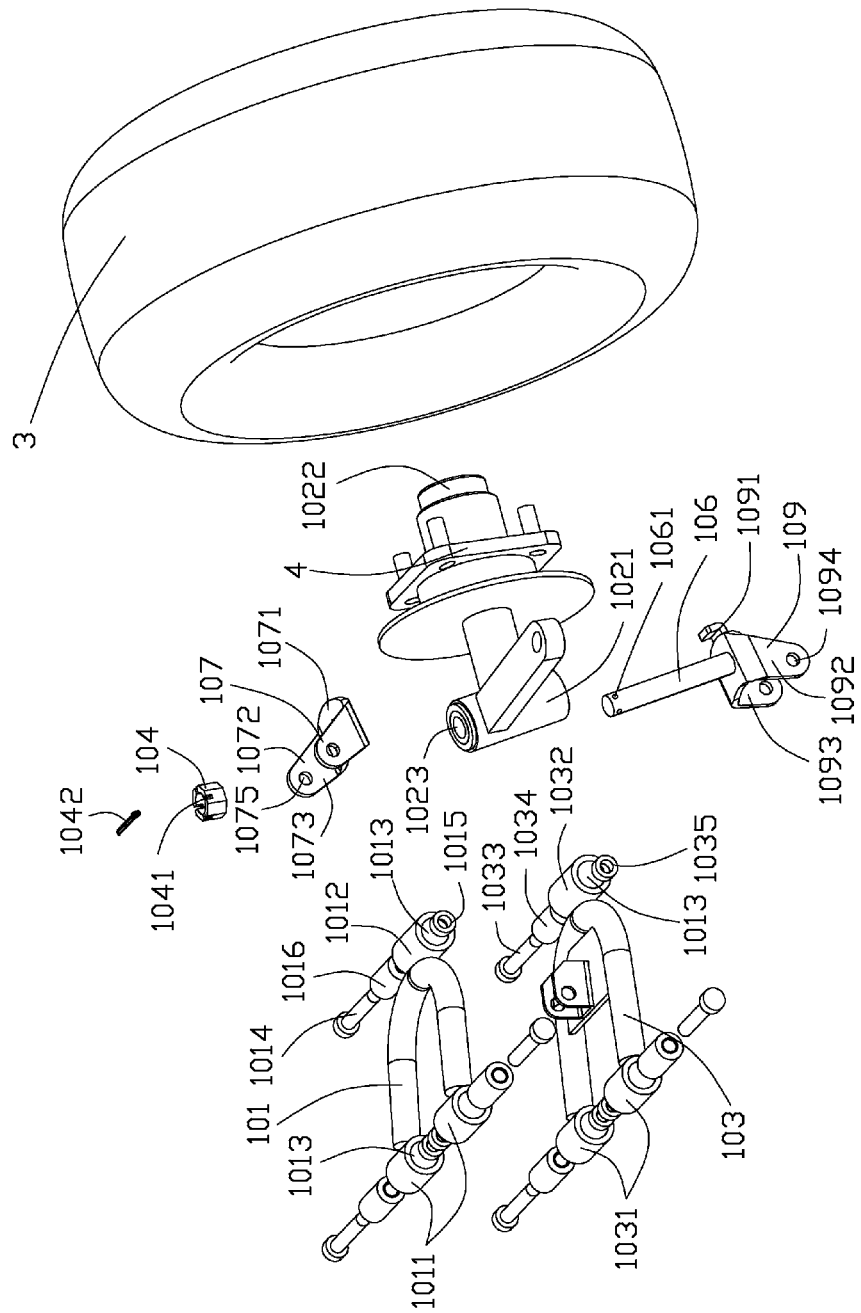
FIG. 2 is a part exploded view of the suspension lift system, as shown in FIG. 1, while separated from a wheel.
Figure 3:
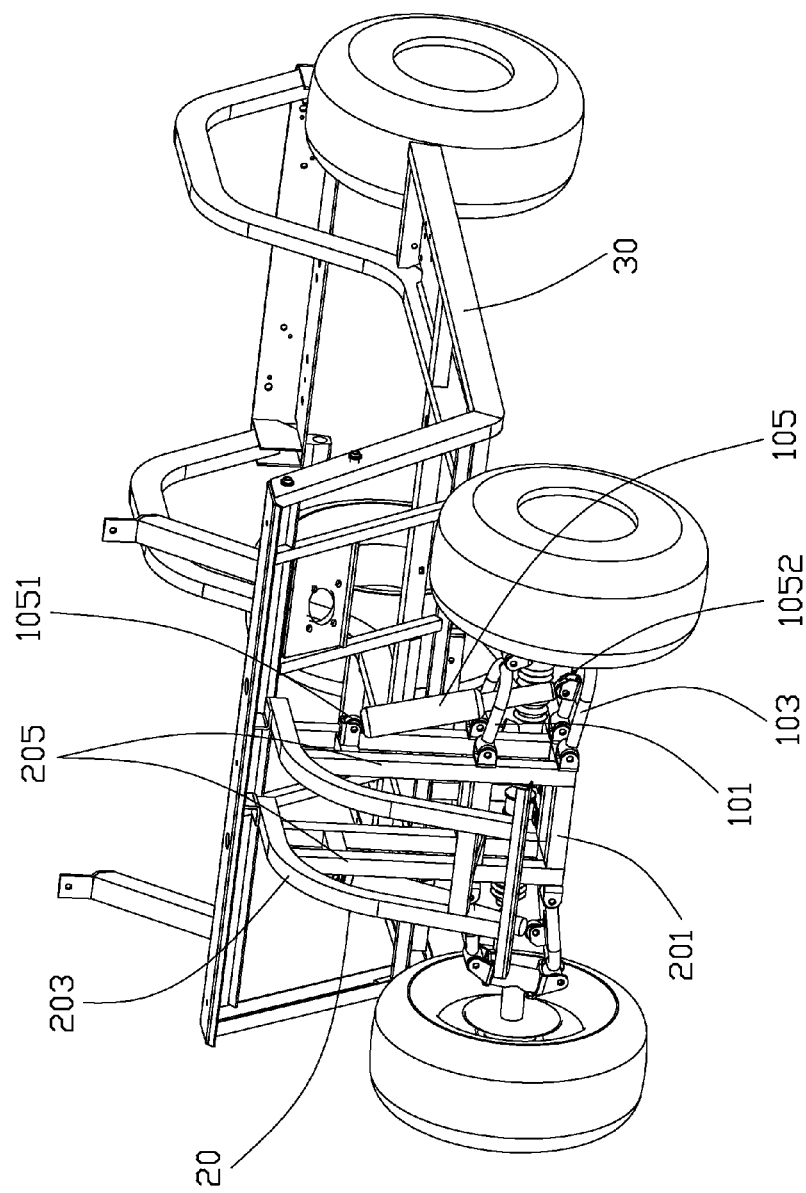
FIG. 3 is a perspective view of the suspension lift system mounted to a carriage according to a first embodiment of the present invention.
Figure 4:
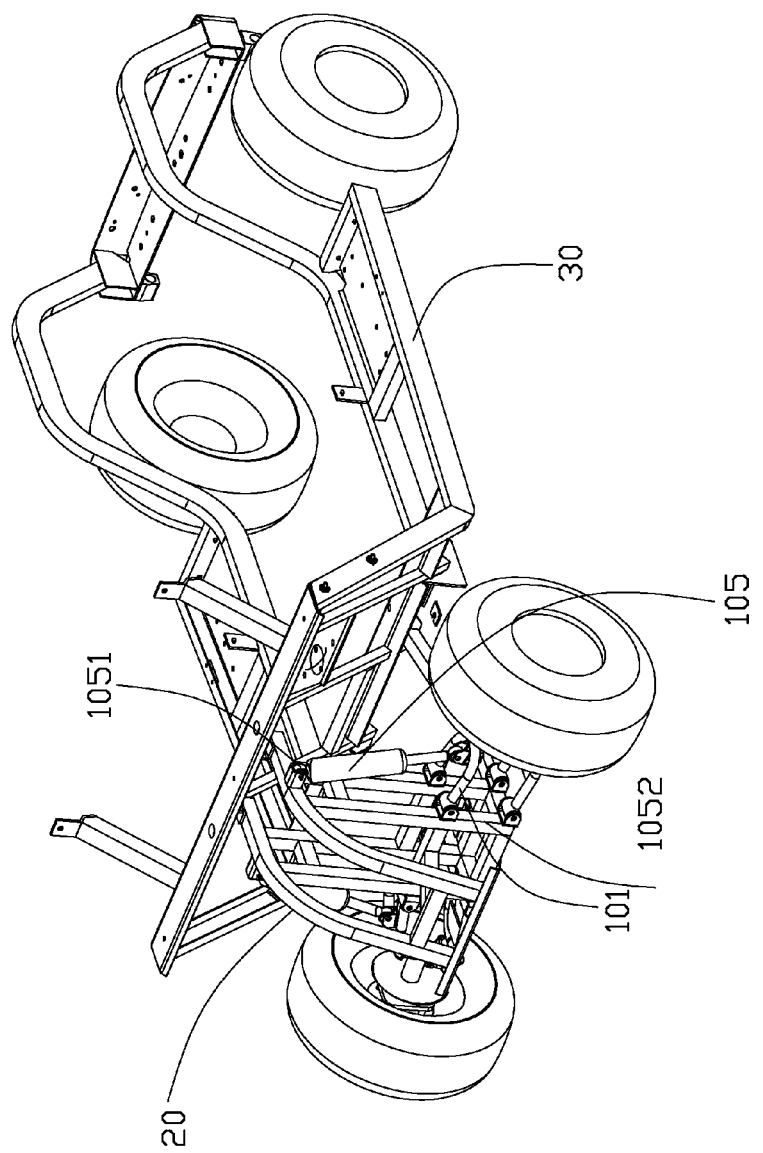
FIG. 4 is another perspective view of the suspension lift system mounted to the carriage according to a second embodiment of the present invention.

Referring to FIGS. 1 to 4, a suspension lift system 10 with dual swing arms according to a preferred embodiment of the present invention is disclosed. As shown in FIGS. 3 and 4, the suspension lift system 10 includes an undetachable front frame 20, a pair of upper arms 101, a pair of lower arms 103, a pair of steering apparatus 102 and a pair of absorbers 105 all symmetrically arranged at opposite lateral sides of the front frame 20. The dual swing arms are comprised of one upper arm 101 and the corresponding lower arm 103 located at the same side of the upper arm 101. The front frame 20 includes a bottom support bracket 201, a front support bracket 203, and a middle support bracket 205 fixed to the bottom support bracket 201 and the front support bracket 203. The front support bracket 203 is outwardly curved from a lower front location to an upper rear location in order to have a stable structure. The middle support bracket 205 is perpendicular to the bottom support bracket 201 in order to reinforce the front frame 20. According to the preferred embodiment of the present invention, the front frame 20 is unitarily welded in order to have a strong configuration. Besides, such front frame 20 has less number of components, whereby a complex assembly can be avoided when it is assembled to a carriage 30.

The upper arm 101 and the lower arm 103 are substantially U-shaped and are arranged parallel to each other. Preferably, the lower arm 103 is longer in length than the upper arm 101. As shown in FIGS. 1 and 2, the upper arm 101 and the lower arm 103 are waveringly connected to a rotatable apparatus 108 which is further rotatably connected to the steering apparatus 102. The upper arm 101 includes a pair of first spindle connection ends 1011 at a first mounting side, and a second spindle connection end 1012 at a second mounting side opposite to the first mounting side. The first and the second spindle connection ends 1011, 1012 are tubular in shape and each comprises a through opening 1013 extending along a transverse direction.

The lower arm 103 is of the same configuration as the upper arm 101. The lower arm 103 includes a pair of third spindle connection ends 1031 at a first mounting side, and a fourth spindle connection end 1032 at a second mounting side opposite to the first mounting side. The third and the fourth spindle connection ends 1031, 1022 are tubular and each comprises a through opening 1033 extending along the transverse direction.

The rotatable apparatus 108 includes an upper bracket 107, a lower bracket 109 and a pole 106 connecting the upper and the lower brackets 107, 109. The upper bracket 107 includes a first base 1071, a pair of first lugs 1072 upwardly extending from the first base 1071, and a first receiving space 1073 formed between the pair of first lugs 1072 for accommodating the second spindle connection end 1012. The first base 1071 defines a mounting hole 1074 through which the pole 106 extends as shown in FIG. 1. The pair of first lugs 1072 are perpendicular to the first base 1071 and extend slantways towards the second spindle connection end 1012 of the upper arm 101, in order to save space and to achieve robust swing. Each first lug 1072 defines a through hole 1075 aligned with the through opening 1013 of the second spindle connection end 1012. The through hole 1075 and the through opening 1013 are threaded by a bolt 1014 from one side to the other side, and the bolt 1014 is fastened by a screw nut 1015 at the other side. A space between the pair of first lugs 1072 is no shorter than a length of the second spindle connection end 1012 so that the second spindle connection end 1012 can be easily received in the first receiving space 1073. Besides, the second spindle connection end 1012 is pivotal with respect to the upper bracket 107 via the bolt 1014. Additionally, a bush 1016 is provided and received in through opening 1013 of the second spindle connection end 1012, in order that the second spindle connection end 1012 can be smoothly pivotal with respect to the upper bracket 107. Besides, the pair of first lugs 1072 can reinforce the structure of the upper bracket 107. Moreover, the pair of first lugs 1072 and the upper bracket 107 with such joint structure can avoid motion interference therebetween during movement of the suspension lift system 10.

The lower bracket 109 is similar to the upper bracket 107 and includes a second base 1091, a pair of second lugs 1092 downwardly extending from the second base 1091, and a second receiving space 1093 formed between the pair of second lugs 1092 for accommodating the fourth spindle connection end 1032. The pole 106 is welded to the second base 1091 for fixation. The pair of second lugs 1092 are perpendicular to the second base 1091 and extend slantways towards the fourth spindle connection end 1032 of the lower arm 103, in order to save space and to achieve robust swing. Each second lug 1092 defines a through hole 1094 aligned with the through opening 1013 of the fourth spindle connection end 1032. The through hole 1094 and the through opening 1013 are threaded by a bolt 1033 from one side to the other side, and the bolt 1033 is secured in place by a screw nut 1035 at the other side. A space between the pair of second lugs 1092 is no shorter than a length of the fourth spindle connection end 1032 so that the fourth spindle connection end 1032 can be easily received in the second receiving space 1093. Besides, the fourth spindle connection end 1032 is pivotal with respect to the lower bracket 109 around the bolt 1033. Additionally, a bush 1034 is provided and received in through opening 1013 of the fourth spindle connection end 1032, in order that the fourth spindle connection end 1032 can be smoothly pivotal with respect to the lower bracket 109.

As shown in FIG. 1, a plurality pairs of lugs 2051 are fixed to the middle support bracket 205 and further extend sidewardly beyond the middle support bracket 205. Each pair of lugs 2051 defining therebetween a receiving opening 2052 for receiving the first and the third spindle connection ends 1011, 1031. A plurality of bolts and nuts are provided for jointing the lugs 2051 to the first and the third spindle connection ends 1011, 1031, in order that the upper and the lower arms 101, 103 can be swing in a vertical plane.

Figure 5:
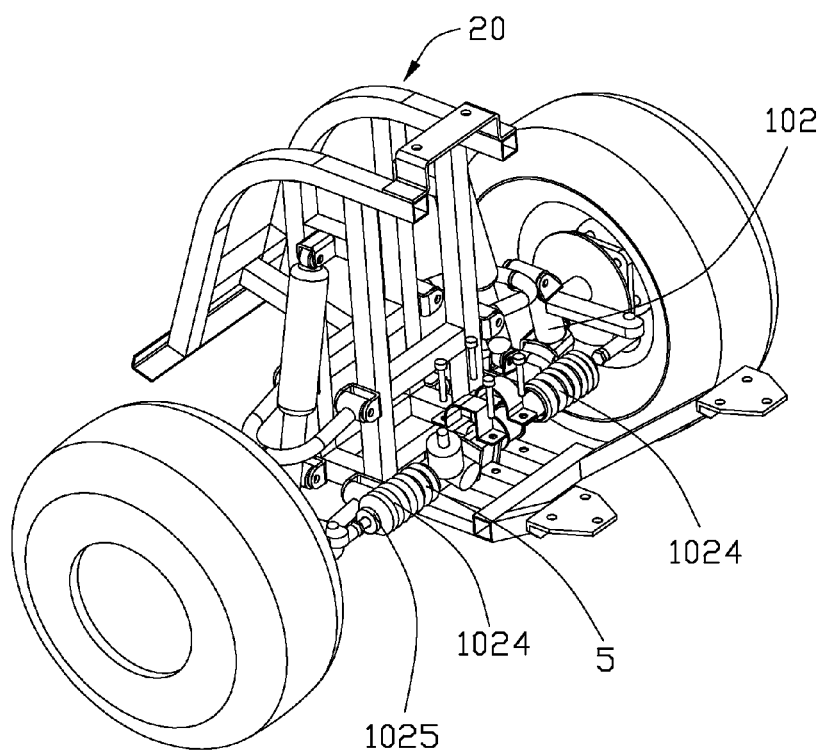
FIG. 5 is a schematic perspective view of the suspension lift system with a pair of redirectors.

As shown in FIGS. 1, 2 and 5, the steering apparatus 102 includes a steering knuckle 4 and a redirector 5 connecting the steering knuckle 4. The steering knuckle 4 includes a sleeve 1021 through which the pole 106 extends, and an axle 1022 adapted to receive a wheel 3. The sleeve 1021 is rotatable with respect to the upper and the lower brackets 107, 109 in a horizontal plane. Besides, a bush 1023 is received in the sleeve 1021 in order to achieve smoothly rotation of the steering apparatus 102.

As shown in FIG. 5, the redirector 5 includes a pair of shafts 1025 and a pair of elastic metal rings 1024 placed around the shafts 1025 for reinforcement. The elastic metal rings 1024 are arranged at a rear of the front frame 20 to connect the steering knuckle 4. According to the preferred embodiment of the present invention, the front frame 20 with such structure can provide reasonable large space for mounting the steering apparatus 102 which can be easily assembled or repaired.

In assembly, the bush 1023 is received in the sleeve 1021. The pole 106 is then assembled through the bush 1023 and further through the mounting hole 1074 to upwardly extend beyond the first base 1071. A nut 104 is then provided for mating with the pole 106 which defines a plurality of position holes 1061 near a distal end thereof. The nut 104 defines a plurality of cutouts 1041 aligned with the position holes 1061 horizontally. Finally, a split pin 1042 is pressed into the cutouts 1041 and the position holes 1061 in order to fix the nut 104 and the pole 106. As a result, the upper and the lower brackets 107, 109 can be rotatable with respect to the sleeve 1021, simultaneously.

Please refer to FIGS. 3 and 4, the absorber 105 includes one end 1051 mounted to the front frame 20 and the other end 1052 mounted to either the upper arm 101 or the lower arm 103. As shown in FIG. 1, the end 1051 of the absorber 105 is received in a space between a pair of sideward protrusions 2053, and the other end 1052 of the absorber is received in another space between another pair of upward protrusions 2054. The two ends 1051, 1052 of the absorber 105 are connected to the protrusions 2053, 2054 via bolts and screw nuts. As a result, the two ends 1051, 1052 of the absorber 105 are swing with respect to the front frame 20.

It is to be understood, however, that even though numerous, characteristics and advantages of the present invention have been set forth in the foregoing description, together with details of the structure and function of the invention, the disclosed is illustrative only, and changes may be made in detail, especially in matters of number, shape, size, and arrangement of parts within the principles of the invention to the full extent indicated by the broad general meaning of the terms in which the appended claims are expressed.

What is claimed is:

1. A suspension lift system for golf carts, comprising:
a carriage;
an undetachable front frame comprising a bottom support bracket, a front support bracket, and a middle support bracket fixed to the bottom support bracket and the front support bracket, the front frame being unitarily welded and then to be fixed to the carriage;
an upper arm comprising a first mounting side pivotally connected to the front frame, and a second mounting side opposite to the first mounting side, the upper arm being swing in a vertical plane, the second mounting side comprising a spindle connection end defining a through opening;
a lower arm comprising a third mounting side pivotally connected to the front frame, and a fourth mounting side opposite to the third mounting side, the lower arm being swing in the vertical plane;
a rotatable apparatus comprising an upper bracket pivotally connected to the second mounting side of the upper arm, a lower bracket pivotally connected to the fourth mounting side of the lower arm, and a pole connecting the upper and the lower brackets, the upper bracket comprising a pair of lugs and a receiving space formed between the pair of lugs for accommodating the spindle connection end, each lug defining a through hole aligned with the through opening;
a steering knuckle comprising a sleeve receiving the pole and an axle adapted to receive a wheel, the sleeve being rotatable in a horizontal plane with respect to the upper and the lower brackets; and
an absorber with one end mounted to the front frame and the other end mounted to either the upper arm or the lower arm; wherein
the through opening of the spindle connection end and the through hole of each lug are threaded by a pin in order to combine the spindle connection end and the upper bracket.

2. The suspension lift system of claim 1, wherein the front support bracket is outwardly curved from a lower front location to an upper rear location.

3. The suspension lift system of claim 1, wherein the middle support bracket is perpendicular to the bottom support bracket in order to reinforce the front frame.

4. The suspension lift system of claim 1, further comprising a plurality pairs of lugs fixed to the middle support bracket, the plurality pairs of lugs extending sidewardly beyond the middle support bracket, each pair of lugs defining therebetween a receiving opening, the first and the third mounting sides each comprising a pair of spindle ends which are received in the receiving openings.

5. The suspension lift system of claim 4, wherein each spindle end and the corresponding pair of lugs are threaded by a bolt from one side to the other side, the bolt being secured by a screw nut at the other side.

6. The suspension lift system of claim 1, wherein the upper arm and the lower arm are U-shaped and are parallel to each other, and wherein the lower arm is longer in length than the upper arm.

7. The suspension lift system of claim 1, further comprising a screw nut to fasten the pin.

8. The suspension lift system of claim 1, wherein the fourth mounting side comprises another spindle connection end, the lower bracket comprising another pair of lugs forming therebetween another receiving space to accommodate the another spindle connection end, the pair of lugs and the another pair of lug extending along opposite directions.

9. The suspension lift system of claim 8, wherein the upper bracket comprises a first base with the pair of lugs upwardly extending therefrom, the lower bracket comprising a second base with the another pair of lugs downwardly extending therefrom, the pole being fixed to the second base and being mounted upwardly through the sleeve and the first base.

10. The suspension lift system of claim 9, wherein the first base defines a mounting hole through which the pole extends, the suspension lift system further comprising a nut for fixing the pole.

11. The suspension lift system of claim 10, wherein the pole defining a position hole upwardly beyond the first base, the nut defining a cutout aligned with the position hole, the suspension lift system further comprising a split pin horizontally pressed into the cutout and the position hole in order to organize the nut and the pole.

12. The suspension lift system of claim 8, wherein the pair of lugs slantways extend towards the spindle connection end of the upper arm.

13. The suspension lift system of claim 1, wherein a space between the pair of lugs is no shorter than a length of the spindle connection end, so that the spindle connection end can be easily received in the receiving space.

14. The suspension lift system of claim 1, further comprising a bush received in the spindle connection end, the pin extending through the bush in order that the upper bracket can be smoothly pivotal about the spindle connection end.

15. The suspension lift system of claim 1, wherein the absorber is secured to the lower arm, the lower arm comprising a pair of upward protrusions defining a slot therebetween for receiving the other end of the absorber.

16. The suspension lift system of claim 1, wherein the absorber is secured to the upper arm, the upper arm comprising a pair of upward protrusions defining a slot therebetween for receiving the other end of the absorber.

17. The suspension lift system of claim 1, wherein a pair of upper arms, a pair of lower arms, and a pair of absorbers are symmetrically arranged at opposite lateral sides of the front frame.

18. The suspension lift system of claim 1, further comprising a redirector which comprises a shaft and an elastic metal ring placed around the shaft for reinforcement, the elastic metal ring being arranged at a rear of the front frame and connecting the steering knuckle.

* * * * *